United States Patent
Hanten et al.

[11] Patent Number: 5,918,447
[45] Date of Patent: Jul. 6, 1999

[54] DEVICE FOR MAKING PORTION PACKS OF A DIVIDABLE FILLING IN A FLEXIBLE TUBULAR CONTAINER

[75] Inventors: Jürgen Hanten, Rockenberg; Günter Vermehren, Usingen, both of Germany

[73] Assignee: Poly-Clip System GmbH & Co. KG, Frankfurt am Main, Germany

[21] Appl. No.: 08/945,072

[22] PCT Filed: Jan. 11, 1997

[86] PCT No.: PCT/EP97/00121

§ 371 Date: Mar. 17, 1998

§ 102(e) Date: Mar. 17, 1998

[87] PCT Pub. No.: WO97/30596

PCT Pub. Date: Aug. 28, 1997

[30] Foreign Application Priority Data

Feb. 23, 1996 [DE] Germany .............. 196 06 654

[51] Int. Cl.[6] .............. B65B 51/00; B65B 51/05
[52] U.S. Cl. .............. 53/551; 53/138.4; 53/577
[58] Field of Search .............. 53/451, 459, 469, 53/551, 552, 138.4, 576, 577, 226

[56] References Cited

U.S. PATENT DOCUMENTS

| | | | |
|---|---|---|---|
| 1,424,363 | 8/1922 | Leumann | 53/226 |
| 1,934,363 | 11/1933 | Smith | 53/226 |
| 2,656,658 | 10/1953 | Grady | 53/577 X |
| 3,563,002 | 2/1971 | Givin | 53/577 X |
| 4,446,677 | 5/1984 | Kokido | 53/577 |
| 4,593,516 | 6/1986 | Alameda et al. | 53/75 |
| 4,750,239 | 6/1988 | Niedecker | 17/34 |
| 5,087,463 | 2/1992 | Raudys et al. | 53/576 X |
| 5,155,976 | 10/1992 | Okabe et al. | 53/576 X |
| 5,495,707 | 3/1996 | Lauzon | 53/572 |

FOREIGN PATENT DOCUMENTS

| | | |
|---|---|---|
| 0507374 A1 | 10/1992 | European Pat. Off. . |
| 1557553 | 1/1969 | France . |
| 1027548 | 9/1958 | Germany . |
| 1586210 | 5/1970 | Germany . |
| 2550042 | 5/1977 | Germany . |
| 3610010 C2 | 10/1987 | Germany . |
| 19606654 C1 | 4/1997 | Germany .............. B65B 9/15 |
| 170301 | 6/1934 | Switzerland . |
| 644126 | 10/1950 | United Kingdom . |
| 809532 | 2/1959 | United Kingdom . |

Primary Examiner—John Sipos
Attorney, Agent, or Firm—Sprung Kramer Schaefer & Briscoe

[57] ABSTRACT

A device for crimping a flexible tubular container filled with a dividable filling to form portion packs thereof, which comprises an outer ring, a concentric inner ring, at least four crimping elements in the form of strips, each of which elements is pivotally mounted at one end thereof to said inner ring and engaged at the other end in recesses radially extended in said outer ring, said crimping elements cooperating to form an aperture of variable size, which can be closed upon rotation of said outer ring to crimp a flexible tubular container inserted therein.

7 Claims, 2 Drawing Sheets

DEVICE FOR MAKING PORTION PACKS OF A DIVIDABLE FILLING IN A FLEXIBLE TUBULAR CONTAINER

This invention relates to a device for making portion packs of a dividable filling in a flexible tubular container by crimping the filled tube and placing at least one seal on the pinched area formed by axially crimping the filling, comprising crimping elements, which in an overlapping manner and symmetrical to the tube axis can be pivoted against each other and together define an aperture of variable size.

Such positioning devices are widely known in connection with sealing devices, in particular for making individual sausages from a sausage strand, for instance from the German patents DE 10 27 548, DE 15 86 210, DE 25 50 042 and DE 36 10 010. Such devices are regularly arranged in working direction behind a filing machine, which by means of a filling pipe presses the filling into the tubular container withdrawn from the outside of said pipe. For portioning purposes, the filling operation is stopped and the portioning and sealing devices are set in operation. Upon completion of their working cycles, the filling operation is continued until portioning and sealing must again be performed.

Apart from crimping elements linearly movable in opposite directions, as they are known for instance from the DE-OS 36 10 010, crimping devices with pivoted crimping elements are also available. The DE-OC19 86 210, for instance, discloses crimping elements comprising pivoted shear portions, whose crimping segments are moved towards the filled tube on circular arcs. The latter is likewise true for the crimping elements known from the DE-OS25 50 042, whose shear arms overlap each other at their tips also in the fully opened condition.

What all known crimping systems have in common is the disadvantage that for various reasons they require very stable constructions and the considerable masses, which must each be accelerated and decelerated, accordingly prevent high cycle rates. It was also found that with higher cycle rates the tubular container may be damaged as a result of the friction of the material of the tube on the crimping plates.

The object of providing a crimping system that can also be used for high cycle rates is solved by the invention in that the crimping elements consist of at least four strips, which with their one ends are stationarily pivoted with equal spacings on a circle concentric with the tube axis, while their other end regions are guided on a ring that is also concentric with the tube axis and to a limited extent can be rotated about the same, so that they extend like chords in the partial circle of their pivots and can perform both pivoting and longitudinal movements in their main plane in relation to the ring. When the ring is rotated (pivoted) from its normal position, in which the strips define an aperture allowing the filled tube to pass through unimpededly, about the tube axis, the strips are at the same time pivoted about their pivots, move towards each other and uniformly reduce the size of the aperture formed between them, without changing the geometrical shape of the aperture; in the case of four strips this is a square. Such pivoting may be continued until the strips have approached each other to a maximum—in the case of four strips the parallel extension of pairs of strips is maintained.

From the U.S. Pat. No. 4,593,516 a device for sealing bags is known per se, which has crimping elements overlapping each other and pivoted against each other symmetrical to the bag axis, which crimping elements together define an aperture of variable size, and where the crimping elements consist of four strips which with their one ends are stationarily pivoted with equal spacings on a circle concentric with the bag axis. At the ends of the pivots, these strips are firmly connected with chain wheels, one of which can be pivoted by means of a lever of a pneumatic cylinder piston and transmits this movement via a chain to the other chain wheels; due to the pivoting movement of the chain wheels the stripe also perform a pivoting movement. The sealing force is thus transmitted exclusively by means of torsion at the swivel axes, which in view of the lever length of the stripe excludes the necessary powerful crimping of, for instance, sausage meat, on the other hand, the ring affecting the pivoting movements in accordance with the invention acts on the other ends of the strips and can thus transmit much larger forces to the same—and thus to the portion packs.

In accordance with the prior art, preferably two identical crimping elements are provided, which can be spread axially apart when closed, so that between the same the seal or a plurality thereof can then be placed on the pinched area, and in accordance with the invention the rings of both crimping elements, which guide the end regions of the strips, are joined together by guide rods parallel to one another and to the tube axis. In both crimping elements, the crimping operation is thus performed synchronously—by rotating the rings guiding the end regions of the strips.

The strips themselves preferably have a flat rectangular cross-section, so that the high moment of resistance of the longer side of the rectangle acts against the required crimping force.

It is furthermore advantageous when the pivots are also arranged on a ring, which as inner ring rotatably supports the (outer) ring guiding the other end regions of the strips.

Further advantageous aspects of the subject-matter of the invention are included in additional sub-claims and can be taken from the subsequent description of an embodiment with reference to the drawing, wherein:

Figure 1:
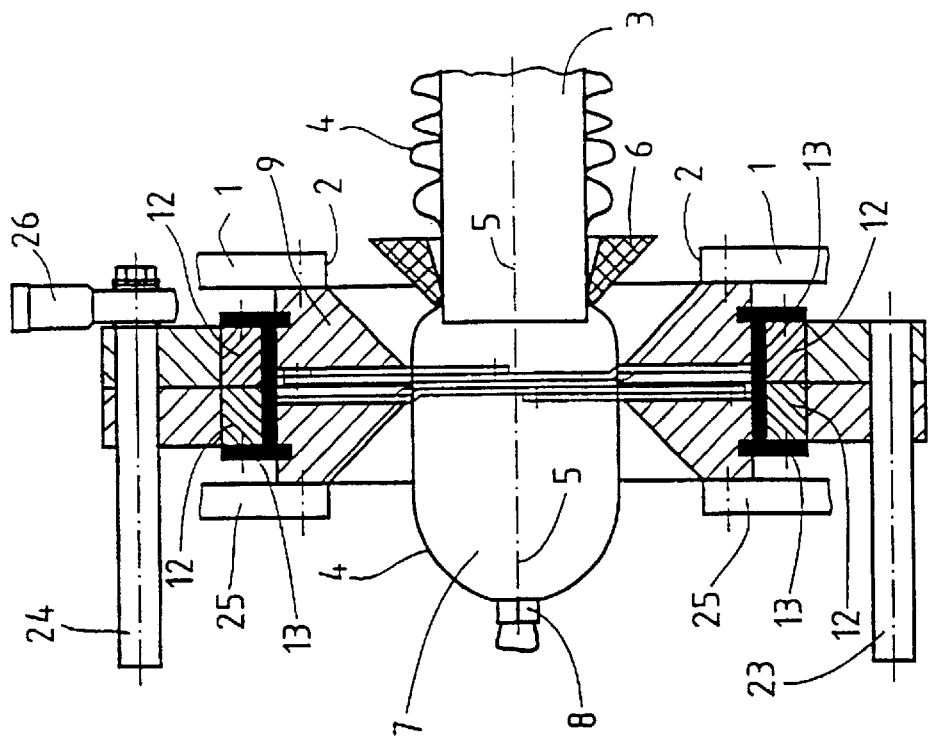
FIG. 1 represents an axial section through the novel—double and spreadable—crimping device.

In the—cut away—wall 1 of a sealing machine a filling pipe 3 extends through an aperture 2, which filling pipe as usual carries the supply of tube 4 threaded onto said pipe in a harmonica-like manner. The axis 5 of the filling pipe 3 therefore also constitutes the tube axis. During the filling operation—as is illustrated in FIG. 1—the tube 4 slips off from the filling pipe 3 through the casing brake 6, because it is entrained by the filling 7—in this case sausage meat; at its front end, the tube 4 is closed by a seal in the form of a clip 8.

At the machine wall 1, coaxially to the tube axis 5 and thus surrounding the aperture 2, an inner ring 9 is fixed. It carries the pivots 10 of four crimping elements in the form of strips 11, whose pivot arrangement in the normal or rest position (—no crimping) can best be seen in FIG. 2. In conjunction with FIG. 1, the latter is also true for the flat rectangular cross-sectional shape of the strips 11, while the cross-section of the inner ring 9 can only be taken from FIG. 1.

On the ring 9 an (outer) ring 12 is rotatably supported and secured against axial displacement by means of (plastic) disks 13. As uniformly distributed on the periphery like the pivots 10 with respect to the ring 9, radially extending recesses 14 are provided in the ring 12, in which recesses the strips 11 engage with their end regions 15 opposite the pivots 10; to compensate the difference in level in the direction of the axis 5, which results from the overlapping strips 11 arranged like chords and represented in FIG. 2, the strips of the one parallel pair are provided with substantially z-shaped bonds 16. In the recesses 14, spaced guiding members 17 are mounted, whose surfaces facing each other are rounded; in the example, circular pins are used, which might also be designed as rotatable rollers. The end regions 15 of the strips 11 are guided between the guiding members 17, as this is in turn clearly shown in FIG. 2.

When the ring 12 is rotated about the axis 5 in the direction of the arrow 18, the end regions 15 of the strips 11 are entrained by the guiding members 17, while the pivots 10 (on the ring 9) remain stationary. This leads to a pivoting movement of the strips 11, which involves a reduction of the square aperture 19 formed between the same, until the condition represented in FIG. 4 has finally been reached, in which the parallel pairs of strips 11 are arranged at a small distance from each other and between each other only include a very small crimping aperture 19, in which the pinched area 20 is compressed (FIG. 3).

Figure 4:
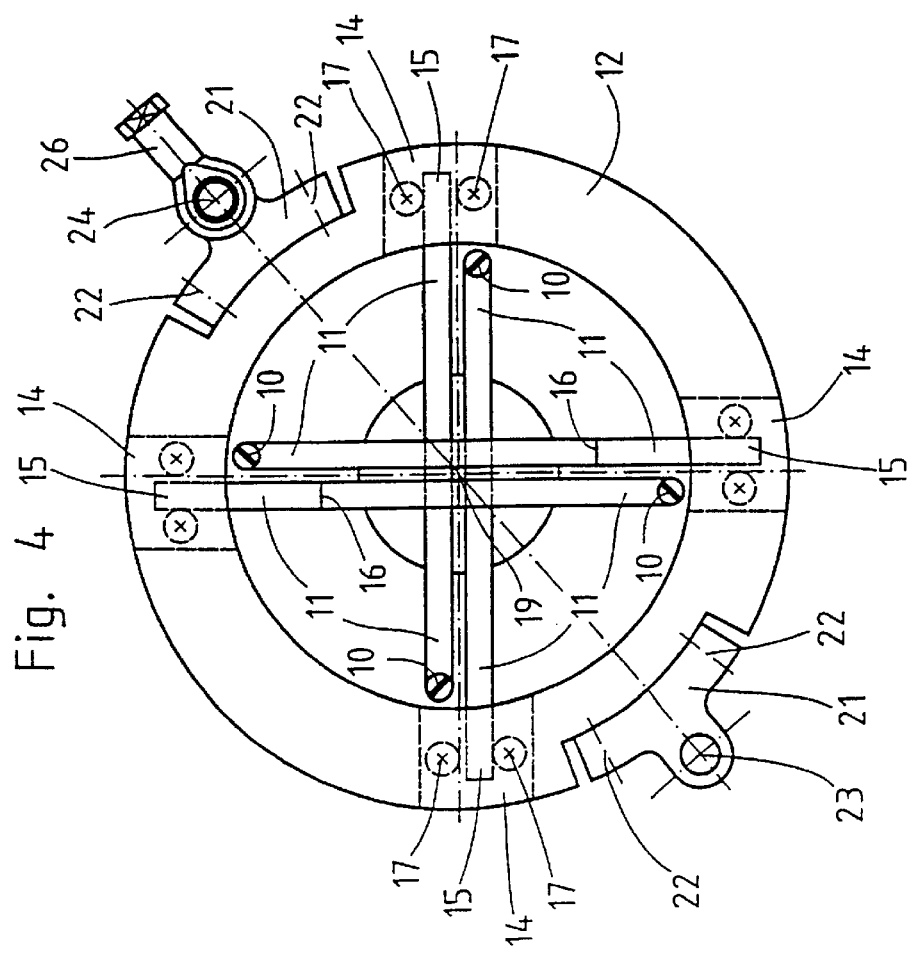
FIG. 4 is a representation corresponding to FIG. 2 in an operating condition in accordance with FIG. 3.

That the recesses 14 in the ring 12 are not disposed exactly radial, because the parallel offset of the strips 11 requires a correspondingly laterally offset arrangement of the guiding members 17, can likewise best be seen in FIG. 4.

Figure 2:
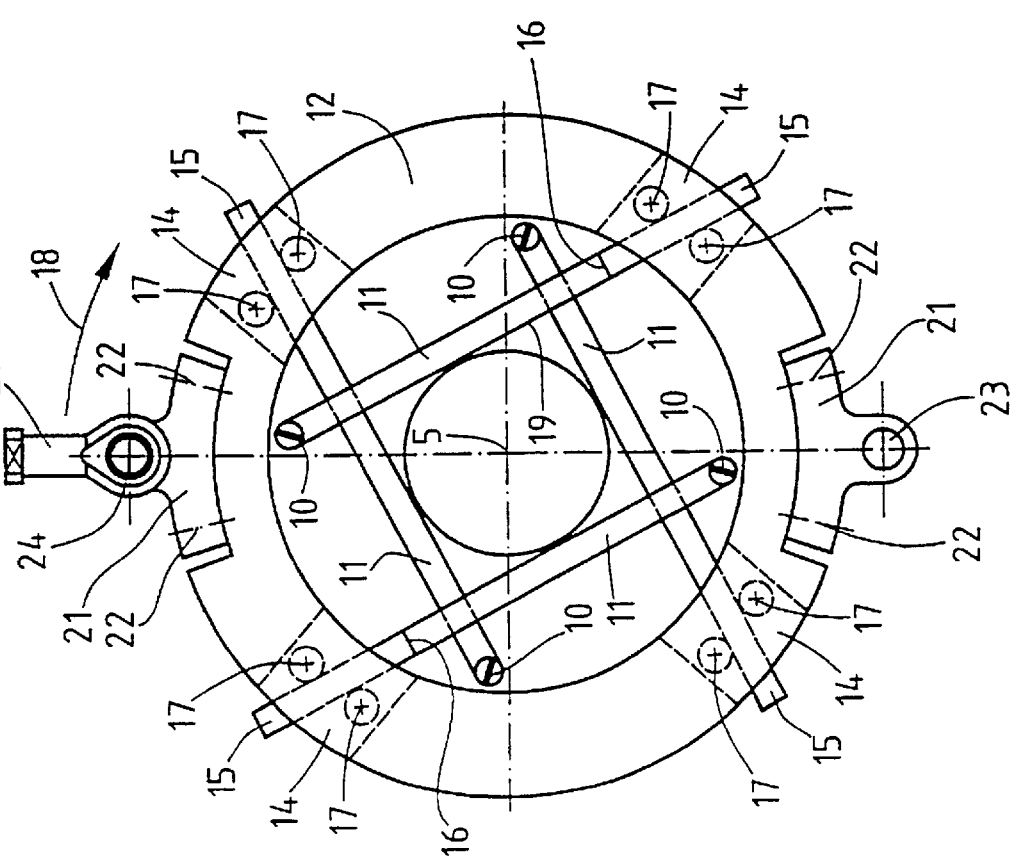
FIG. 2 is a top view of the (right-hand, close to the filling pipe) crimping device of FIG. 1.
Figure 3:
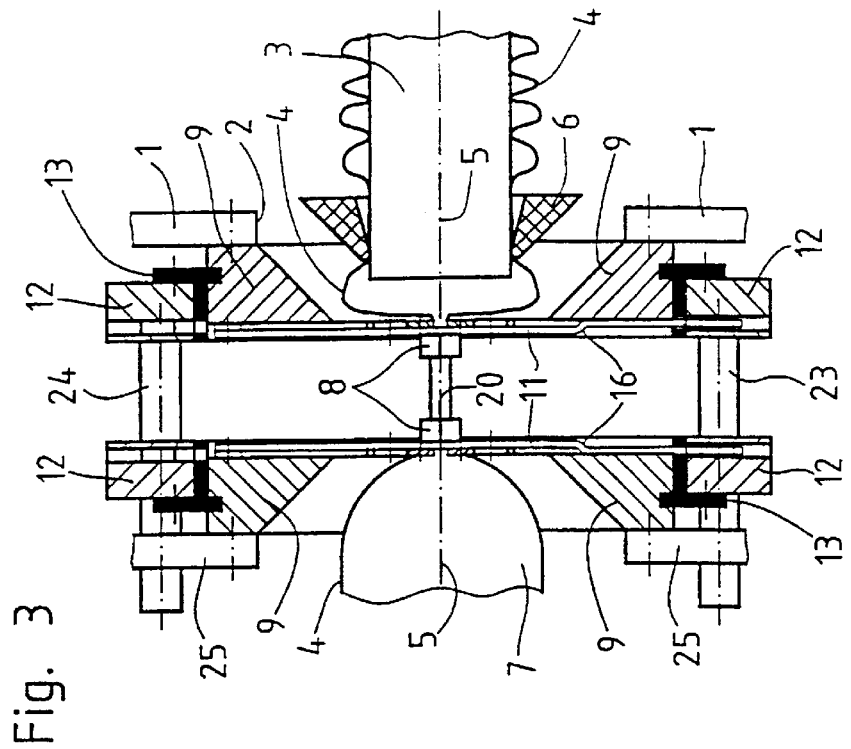
FIG. 3 is a representation corresponding to FIG. 1 after crimping and spreading.

While FIGS. 2 and 4 only illustrate the portioning and crimping device on the side of the filling pipe, the sections represented in FIGS. 1 and 3 illustrate the complete, spreadable double unit of two identically designed crimping devices, which are, however, arranged laterally reversed with respect to each other. On both (outer) rings 12 coupling members 21 are fixed, and in such a manner that the relative circumferential position with respect to the ring 12 can be adjusted to a restricted extent by means of the fastening screws 22 indicated in dash-dotted lines. On the coupling members 21 of the crimping element on the side of the filling pipe guide rods 23 and 24 are fixed at diametrically opposite points, while the coupling members 21 of the other crimping element can slide thereon for effecting the spreading operation, which can be taken from the synopsis of FIGS. 1 and 3. The spreading operation is controlled by—not represented—actuators, which act on the flange 25 (shown in a cutaway representation), which in turn is fixed at the inner ring 9 of the outer crimping element. On the correspondingly prolonged guide rod 24 and the associated coupling member 21 of the crimping element on the side of the filling pipe a toggle link socket 26 is disposed, by means of which the actuating force for the pivoting movement of the (outer) rings 12 can be applied in the direction of the arrow 18.

The independent adjustability of the circumferential position of the two rings 12 with respect to the guide rods 23, 24 provides for adjusting the size of the crimping aperture 19 in the closed condition (FIG. 4) slightly differently in both crimping elements, so as to ensure that during the spreading operation the pinched area 20 is pulled through the crimping element on the side of the filling pipe (FIG. 3).

We claim:

1. A device for forming portion packs of a dividable filling in a flexible tubular container by crimping said tubular container, which comprises an outer ring (12) and a concentric inner ring (9), said outer ring being rotatably supported by said inner ring (9) and being secured against axial displacement with respect to said inner ring (9), at least four crimping elements (11) in the form of strips each having a first end and a second end, each of which is individually pivotally mounted at the first end thereof to inner ring (9) at pivots (10) which are equally spaced apart from each other around the periphery of inner ring (9), said outer ring (12) having unilaterally radial recesses (14) equally spaced apart from each other around the periphery thereof, within which rounded pairs of guiding members (17) are disposed between which the second ends (15) of each of the strips (11) are loosely inserted whereby said strips are displaced with respect to each other and cooperate to form an aperture (19) of variable size, and wherein rotation of outer ring (12) with respect to inner ring (9) in one direction causes the displacement of the comprising elements (11) with respect to each other to decrease, so that said aperture (19) closes, whereas rotation of outer ring (12) in the opposite direction with respect to inner ring (9) causes the displacement of the crimping elements (11) to increase with respect to each other, so that said aperture (19) opens so that, in operation, said flexible tubular container is inserted through said aperture (19), said outer ring is rotated to cause said crimping elements to move closer to each other and close said aperture, thereby crimping said flexible tubular container, and then said outer ring (12) is rotated in the opposite direction to release said flexible tubular container.

2. The device as claimed in claim 1, wherein the strips (11) have a flat rectangular cross-section.

3. The device as claimed in claim 1, wherein said device is mounted on a sealing machine having a housing, said housing having a wall (1) which wall has an aperture (2) through which a filling pipe extends, and wherein the inner ring (9) of said device is fixed at the machine housing of said sealing machine concentrically with respect to the axis of the filling pipe, said filling pipe being coaxial to the axis (5) of a tubular container being filled.

4. The device as claimed in claim 1, wherein on the outer ring (12) guiding the second ends (15) of the strips (11) coupling members (21) are disposed for rotary actuation and are adjustably fixed (22) in angular position with respect to the ring (12).

5. The device as claimed in claim 1 comprising four strips with at least two of which are parallel, wherein the second ends (15) of two parallel strips (11) are bent in a Z-shaped manner by an amount about equal to their thickness.

6. The device as claimed in claim 4 comprising two crimping elements which in the closed condition can be axially moved with respect to each other, wherein the outer rings (12) guiding the seconds ends (15) of the strips (11) are joined together by guide rods (23, 24) parallel to each other and to the tube axis (5).

7. The device as claimed in claim 6, wherein the guide rods (23, 24) are fixed at the coupling members (21) or guided in the same.

* * * * *

UNITED STATES PATENT AND TRADEMARK OFFICE
CERTIFICATE OF CORRECTION

PATENT NO : 5,918,447
DATED : July 6, 1999
INVENTOR(S): Jurgen HANTEN, et al.

It is certified that error appears in the above-identified patent and that said Letters Patent is hereby corrected as shown below:

"U.S. Patent Document"  1,934,363, 11/1993, Smith 53/226
should read "1,934,756, 11/1993, Smith 53/226

Column 4, line 21,  cancel "comprising" and substitute --crimping--

Signed and Sealed this

Twenty-eighth Day of December, 1999

Attest:

Q. TODD DICKINSON

*Attesting Officer*  *Acting Commissioner of Patents and Trademarks*